United States Patent
Baudin et al.

(10) Patent No.: US 7,174,507 B2
(45) Date of Patent: Feb. 6, 2007

(54) SYSTEM METHOD AND COMPUTER PROGRAM PRODUCT FOR OBTAINING STRUCTURED DATA FROM TEXT

(75) Inventors: Catherine Marie Baudin, Paris (FR); Michel Vladimir Manago, Paris (FR); Olivier Camille Madec, Paris (FR)

(73) Assignee: Kaidara S.A., Paris (FR)

( * ) Notice: Subject to any disclaimer, the term of this patent is extended or adjusted under 35 U.S.C. 154(b) by 492 days.

(21) Appl. No.: 10/360,864

(22) Filed: Feb. 10, 2003

(65) Prior Publication Data
US 2004/0163043 A1   Aug. 19, 2004

(51) Int. Cl.
*G06F 15/00*   (2006.01)

(52) U.S. Cl. .............. 715/513; 715/523; 715/531; 715/538

(58) Field of Classification Search ............ 715/523, 715/513, 531, 538
See application file for complete search history.

(56) References Cited

U.S. PATENT DOCUMENTS

| | | | |
|---|---|---|---|
| 6,076,088 A | 6/2000 | Paik et al. | 707/5 |
| 6,272,537 B1* | 8/2001 | Kekic et al. | 709/223 |
| 6,711,585 B1* | 3/2004 | Copperman et al. | 707/104.1 |
| 6,845,373 B2* | 1/2005 | Linhart | 707/3 |
| 2002/0152227 A1* | 10/2002 | Winokur | 707/201 |
| 2003/0143956 A1* | 7/2003 | Taylor | 455/67.1 |
| 2004/0117740 A1* | 6/2004 | Chen et al. | 715/531 |
| 2005/0050037 A1* | 3/2005 | Frieder et al. | 707/3 |
| 2005/0154971 A1* | 7/2005 | Nagao | 715/500 |

FOREIGN PATENT DOCUMENTS

| | | |
|---|---|---|
| WO | WO 01/88747 A2 | 11/2001 |
| WO | WO 02/073331 A2 | 9/2002 |
| WO | WO 02/27524 A2 | 4/2004 |

OTHER PUBLICATIONS

Baeza-Yates, R. Ribeiro-Neto: "Modem Information Retrieval," 1999, pp. 163-190.
Mikheev, A., Finch, S., "Towards a Workbench for Acquistion of Domain Knowledge from Natural Language," Proceedings of the Seventh Conference of the European Chapter for Computational Linguistics, Mar. 1994, online at: http://ucrel.lancs.ac.uk/acl/E/E95/E95-1027.pdf.

* cited by examiner

*Primary Examiner*—Stephen Hong
*Assistant Examiner*—Kristina Honeycutt
(74) *Attorney, Agent, or Firm*—Vedder, Price, Kaufman & Kammholz, P.C.

(57) ABSTRACT

A method, system, and computer program product for obtaining structured data from text includes inputting text to be transformed into structured data, defining at least one criterion relating to content of the text, applying a first matching method to the text to identify a value in the text for each of the criterion, and applying a second matching method to the text to identify a value in the text for each of the criterion that the first matching method fails to identify a value for. Each of the criterion is then associated with a value obtained by the first or second matching method to create at least one criterion-value pair, and structured data is created based on the at least one criterion-value pair. The first matching method has a higher reliability than the second matching method.

17 Claims, 6 Drawing Sheets

SYSTEM METHOD AND COMPUTER PROGRAM PRODUCT FOR OBTAINING STRUCTURED DATA FROM TEXT

BACKGROUND OF THE INVENTION

1. Field of the Invention

The present invention relates to a system, method, and computer program product for obtaining structured data, and more particularly to a system, method and computer program product for transforming unstructured or semi-structured text into structured criterion-value pairs that can be processed by a structured information system.

2. Discussion of the Background

The power of advisory and information access systems largely depends on the level of structure of the data these systems operate on. Structured data systems process records formatted as a set of criteria and normalized values whereas text-based systems generally operate on the full-text of a document. Full-text information systems are sometimes extended with natural language search capabilities but are mostly geared toward general document retrieval tasks and are limited in their abilities to adequately interpret numerical data. By contrast, fully structured information systems based on a controlled vocabulary can perform powerful data mining tasks such as integrating data from multiple sources, interacting with users when a query is incomplete or ambiguous, discussing tradeoffs and alternative solutions to complex problems, and learning how to extrapolate solutions from previous situations.

For these reasons powerful customer advisory systems are generally based on structured data and domain models created by experts. For example, Case Based Reasoning (CBR) systems provide a mechanism and methodology for building intelligent computer systems that solve new problems based on previous experiences (cases) stored in memory. In post sales diagnostic advisory applications, past experience in the form of structured troubleshooting records can be used to learn relationships between symptoms and solutions in order to extend the scope of problems that can be diagnosed. These structural advisory systems, however, have no means for exploiting textual content.

While some data in corporate databases, merchant catalogs, or troubleshooting records contains structured information, much of the data includes regions of semi-formatted or unstructured text. For instance product descriptions in online catalogs might be associated with a small number of structured fields such as price or product category as well as with more detailed free-text descriptions of the product characteristics. Likewise many sales or troubleshooting records in company databases are semi-formatted and include text that provides precious information on customer interactions (questions, problems, objections, comments, etc.). Therefore, much of the useful data stored by many organizations is text data that is unavailable for application to powerful structure based systems developed by the organization.

There are different ways of combining unstructured and structured data. One way is to combine full-text search with structured retrieval in two distinct phases. Examples of this method are described in Daniels, J. J. and Rissland, E. L (1997) What you saw is what you want: Using cases to seed information retrieval, *Proceedings of the Second International Conference on Case-Based Reasoning, Case-Based Reasoning Research and Development* ICCBR-97. Providence, R.I. July pp. 325–336. Lecture Notes in AI Series No. 1266. Springer: Berlin; and Lenz, M. and Burkhard, H.-D. (1997) CBR for Document Retrieval: The FAllQ Project *Proceedings of the Second International Conference on Case-Based Reasoning, Case-Based Reasoning Research and Development* ICCBR-97. Providence, R.I. July. pp. 84–93. Lecture Notes in AI Series No. 1266. Springer: Berlin. The entire content of these publications is incorporated herein by reference. These approaches in these documents are limited, however, because useful information is left buried in the text and out of the reach of the structural data processing engine.

Another technique is to transform the input text into structured data before feeding these data to the structural data processing engine. Examples of text extraction are disclosed in Cowie, J. and Lehnert, W. (1996) Information Extraction, *Communications of the ACM*, 39 (1) pp. 80–91, the entire content of which is also incorporated herein by reference. However, text transformation methods are unique to the formatting characteristics of the text to be transformed. For example, high reliability transformation methods that rely on formatting characteristics of the text can be created to transform text having a high degree of contextual regularity. Other less reliable methods that do not rely on formatting characteristics must be created for text having less regularity.

More specifically, text extraction techniques based on Pattern-based rules and grammars can be based on various syntaxes. For instance, regular expressions syntax is powerful but rigid in the sense that all variation of a term must be explicitly mentioned in the rule and that it is not tolerant to any kind of misspelling and syntactic variations not mentioned explicitly in the pattern. Pattern-based rules have been especially popular for parsing semi-structured sources such as web pages and the like. In general however, pattern-based extractors are brittle and must be adapted when the format of the source changes. Methods based on finite-state automata and on lexical parsers are more robust and flexible than pure expressions but have problems finding correct relationships between nodes when information is spread over multiple or ill formatted sentences. In any case, the present inventors have recognized that pattern-based extraction requires the presence of regularities around the entities of interest and are well suited to extract numerical values or semi-structured data; in free-text however such regularities might not always be explicit in a text. An example of the finite automata method is disclosed in D. E. Appelt et.al. FASTUS: A Finite-state Processor for Information Extraction from Realworld Text. In Proceedings of the International Joint Conference on Artificial Intelligence, 1993, the entire content of which is incorporated herein by reference. An example of a full lexical parser can be found in: James Allan, Ron Papka, and Victor Lavrenko. On-line new event detection and tracking. In Proc. ACM SIGIR, pages 37–45, 1998, the entire content of which is also incorporated herein by reference.

In contrast to pattern-based matching methods, Dictionary/ontology-based entity extractors automatically identify and semantically tag regions of text by matching each group of words to a pre-defined vocabulary. For instance, people name extractors use a dictionary of first name and heuristics to classify an entity; company names may use a dictionary of common name parts and extensions (corp., inc. etc.), countries and region are usually directly matched to lists of country and region names. Examples of such method can be found in: Rau, Lisa 1991. Extracting company names from text in Proceedings of IEEE Conference on AI Applications, 1991, the entire content of which is incorporated herein by reference. The advantage of these identification methods is that they tend to be more resistant to syntactic variations such as misspellings and that they are less reactive to formatting changes. The present inventors have recognized however, that the disadvantage of ontology based methods is that one must first acquire a pre-defined vocabulary or face a high degree of failure (low recall). In addition when applied to the generation of structured records from text, these methods can lead to ambiguity because not enough context is provided to decide what value should be assigned to what particular attribute.

SUMMARY OF THE INVENTION

An object of the present invention is to address the above-described problems.

Another object of the present invention is to convert unstructured or semi-formatted data into structured data.

Yet another object of the present invention is to provide a simple and reliable method of converting text to structured data when a wide variety of contextual regularity exists in the text to be converted.

These and other objects are achieved by providing a novel method, system, and computer program product for obtaining structured data from text. The method, on which the system and computer program product are based, includes inputting text to be transformed into structured data, defining at least one criterion relating to content of the text, applying a first matching method to the text to identify a value in the text for each of the criterion, and applying a second matching method to the text to identify a value in the text for each of the criterion that the first matching method fails to identify a value for. Each of the criterion is then associated with a value obtained by the first or second matching method to create at least one criterion-value pair, and structured data is created based on the at least one criterion-value pair. The first matching method has a higher reliability than the second matching method.

In one embodiment, inputting text may include using a parsing script to decompose the text into a series of words and separators sequenced in the order of the apparition order in the text, and mark stop words and common words based on a list of words in the parsing script. In addition defining a criterion may include inputting each of the criterion on the fly in response to a user input. In this embodiment, the method further includes inputting at least one initial value corresponding to any of the criterion in response to a user input, the initial value being used in at least one of the first and second matching methods.

The defining a criterion may include importing at least one of the criterion from a domain model. In this embodiment, the method further includes importing an initial value corresponding to any of the criterion from the domain model, the initial value being used in at least one of the first and second matching methods. At least one synonym may also be imported for any value or initial value from the domain model, the synonym being used in at least one of the first and second matching methods. Moreover, a criticality weight corresponding to any of the criterion from the domain model, or a relationship corresponding to any two of the criterion may be imported.

Applying a first matching method may include applying a pattern-based matching method to the text to identify a value in the text for each of the criterion. In this embodiment, the pattern-based matching method may include applying an extraction rule that does not require an initial value, to the text to identify a value in the text for the criterion. Alternatively, applying a pattern-based matching method may include applying a constrained extraction rule that requires an initial value to the text to identify a value in the text for the criterion. This embodiment may further include importing the initial value from a domain model. Still alternatively, applying a pattern-based matching method may include applying an action rule to the text to identify a value in the text for the criterion. This embodiment may further include inputting a user action corresponding to the action rule.

Applying a second matching method may include applying an ontology-based matching method requiring initial values to the text to identify a value in the text for each of the criterion. This embodiment may further include inputting at least one of the initial values as a value returned by the first matching method, or importing the initial values from a domain model. In addition, a tolerance level may be defined to control a degree of closeness between the text and the initial values that is necessary to identify a value in the text for the criterion. In this embodiment, defining a tolerance level may include defining at least one of a word similarity threshold and a global similarity threshold. Defining a tolerance level may also include defining a proximity window for the ontology-based matching method.

The inventive method may further include detecting conflicts when words in the input text match more than one of the criteria. In this embodiment, the method may also include resolving the conflicts by applying a can reuse property, an ignore conflicts property to the method, or by displaying a clarifying question to the user if user interaction is allowed in the settings. The inventive method may also include assigning a confidence level to any of the criterion-value pairs. In this embodiment, assigning, assigning a confidence level may include assigning a confidence level based on at least one of the reliability factor of the matching method used to create the any of the criterion-value pairs, a recognition performance of the any of the criterion-value pairs, and a degree of ambiguity in the any of the criterion-value pairs. A matching weight may also be assigned to the any of the criterion-value pairs based on the confidence level of the any of the criterion-value pairs and a length of the value in the any of the criterion-value pairs. In this embodiment, the creating structured data includes defining the any of the criterion-value pairs as structured data if the matching weight of the any of the criterion-value pairs is greater than a predetermined weight threshold. A clarifying question or validation set may be generated for any of the criterion-value pairs having a matching less than the weight threshold.

The inventive method may further include propagating values of the structured data to a domain model. In this embodiment the propagating includes creating an initial domain model with the values. Propagation may also include updating a preexisting domain model with the values and the first and second matching methods may be synchronized with the domain model. In this embodiment, the propagation also includes preventing text terms used to obtain the values from being used to provide other values, or deactivating values in the model based on relationships between criteria. The text may be reevaluated using the synchronized methods.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
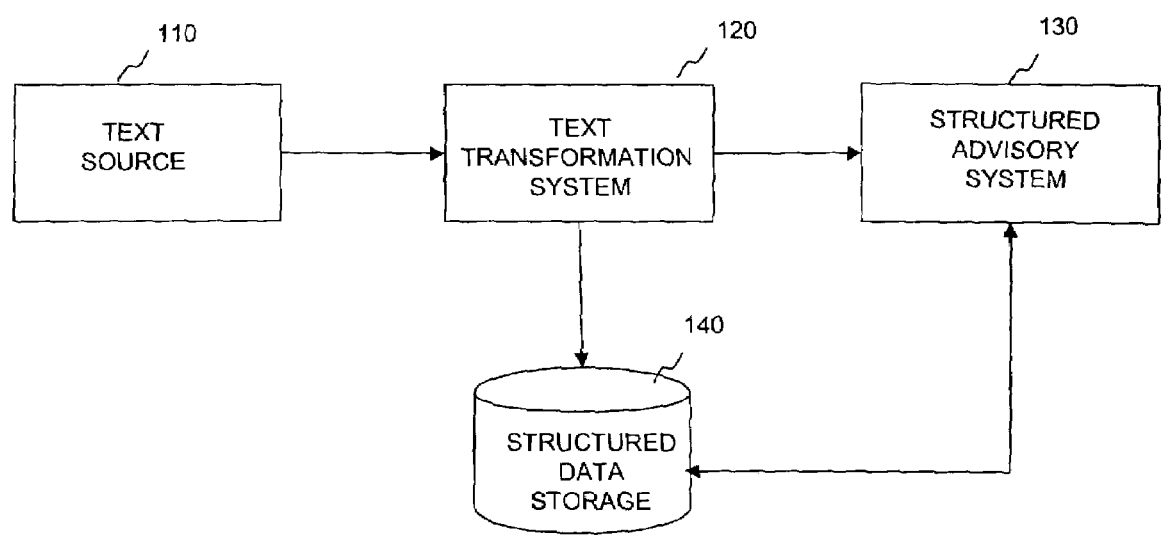
FIG. 1 thereof, there is shown a computerized system for transforming text into structured data usable in a structured information system according to an embodiment of the present invention.

Referring now to the drawings, wherein like reference numerals designate identical or corresponding parts throughout the several views, and more particularly to FIG. 1 thereof, there is shown a computerized system for transforming text into structured data usable in a structured information system according to an embodiment of the present invention. The system of FIG. 1 includes text source 110, text transformation system 120, structured advisory system 130, and structured data storage 140.

The text source 110 is any suitable workstation, server, or other device for communicating with the text transformation system 120 to provide unstructured or semi-structured text to the text transformation system 120. The text source 110 may use any suitable protocol for communicating with the text transformation system 120, and may be implemented using the computer system 601 of FIG. 6, for example. In one embodiment of the invention, the text source 110 may be a computer terminal operated by an end user to interact with the structured advisory system 130 by entering free text natural language queries. Alternatively, the text source may be a storage device including bulk text to be input to the text transformation system 110 and converted to structured data usable by the structured information system 130.

Figure 6:
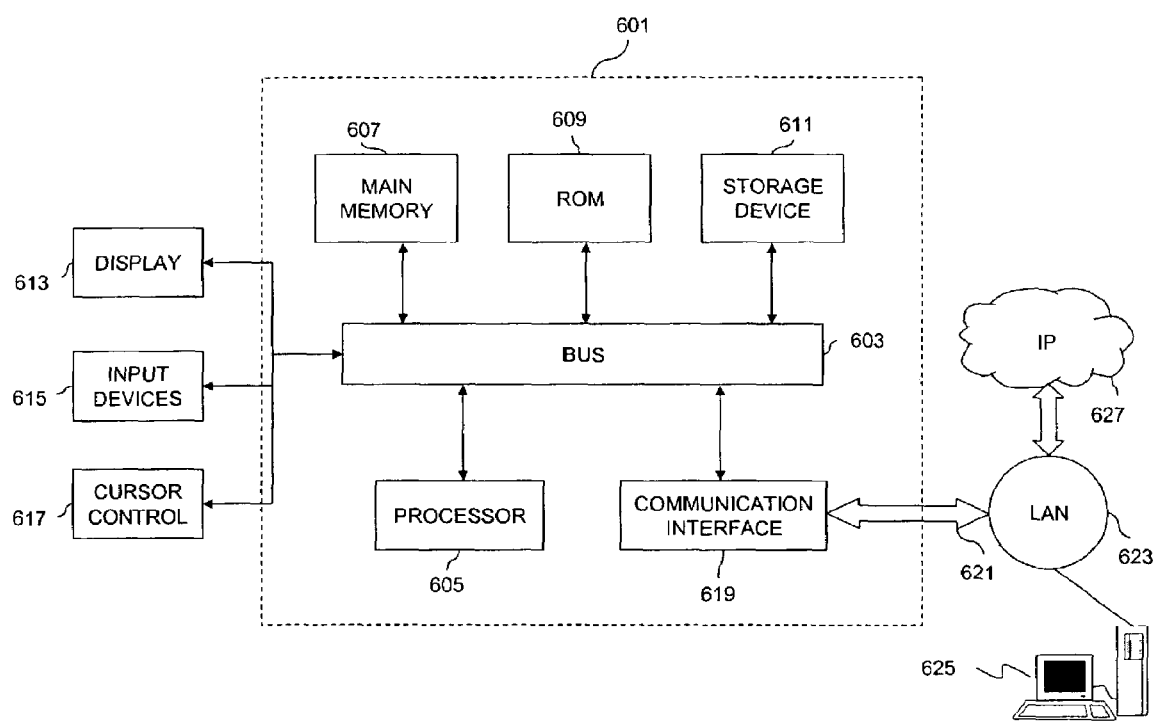
FIG. 6 illustrates a computer system which may be used to implement a text transformation process according to an embodiment of the present invention.

The text transformation system 120 may be implemented using the computer system 601 of FIG. 6, for example, or any other suitable PC, workstation, server, or device for communicating with the text source 110 and structured advisory system 130, and for storing and retrieving data from the structured data storage 140. The text transformation system 120 implements software tools to convert the text from the text source 110 into criterion-value pairs that are usable to the structured advisory system 130. As noted above, the text transformation system 120 may be used to convert bulk text or free text user queries into structured data. Where the text transformation system is used to convert bulk text into structured data, the output of the text transformation system is stored in structured data storage 140. The structured data storage 140 is a storage device such as a magnetic or optical storage unit that stores a base of structured records output from the text transformation system 120. The structured data storage 140 may be implemented as one or more databases having operations for searching, sorting, recombining, and other database functions. The base of structured data in the structural data storage 140 is made available to the structured advisory system 130 for solving problems.

Where the text transformation system is used to convert free text user queries into structured data, the output of the text transformation system is applied directly to the structured data system 130 as shown in FIG. 1. The structured advisory system 130 is any suitable workstation, server, or other device for communicating with the text transformation system 120 and structured data storage 140 using any suitable protocol. The structured advisory system 130 is an information system that processes records formatted as a set of criterion and normalized values. Thus, as noted in the background section above, the structured advisory system 130 can perform powerful data mining tasks such as integrating data from multiple sources, interacting with users when a query is incomplete or ambiguous, discussing tradeoffs and alternative solutions to complex problems, and learning how to extrapolate solutions from previous situations. The structured advisory system may be a case based reasoning (CBR) system, a database management system, a spreadsheet, an object oriented system, or any other structured information system and may be implemented as a general purpose computer such as the computer 601 of FIG. 6.

It is to be understood that the system in FIG. 1 is for exemplary purposes only, as many variations of the specific hardware and software used to implement the present invention will be readily apparent to one having ordinary skill in the art. For example, the functionality of the text transformation system 120 and the structured advisory system 130 may be combined in a single device. To implement these variations as well as other variations, a single computer (e.g., the computer system 601 of FIG. 6) may be programmed to perform the special purpose functions of two or more of any of the devices numbered 110 through 140 shown in FIG. 1. On the other hand, two or more programmed computers may be substituted for any one of the devices numbered 110 through 140 shown in FIG. 1. Principles and advantages of distributed processing, such as redundancy and replication, may also be implemented as desired to increase the robustness and performance of the system, for example.

Figure 2:
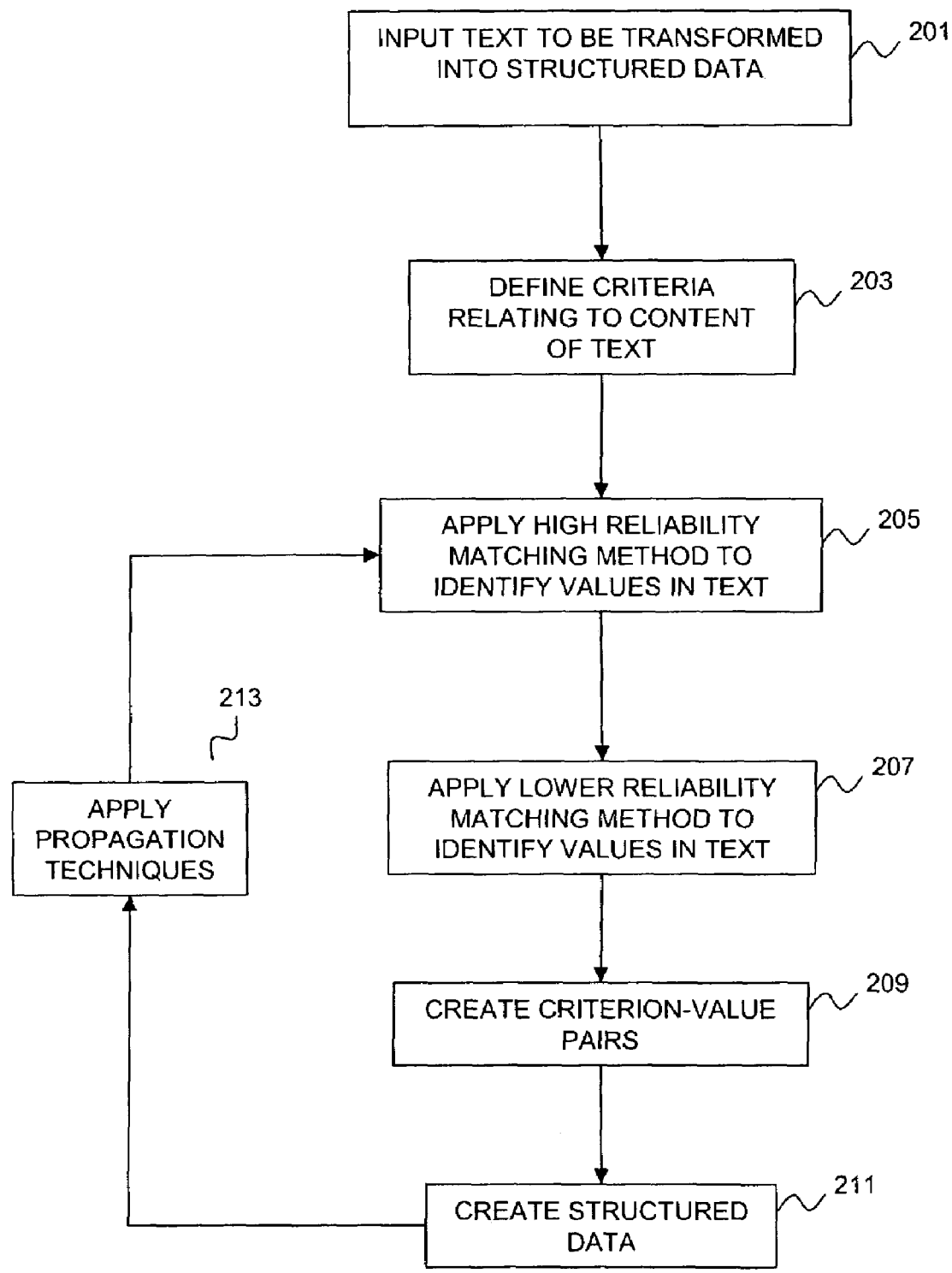
FIG. 2 is a flow chart showing a text transformation process that may be performed by the text transformation system in accordance with an embodiment of the present invention.

FIG. 2 is a flow chart showing a text transformation process that may be performed by the text transformation system 120 in accordance with an embodiment of the present invention. As seen in step 201, the process begins with inputting the text to be transformed into structured data. As noted above, the input text may be a user query or bulk text files such as web pages, semi-formatted database records, on-line catalogs or unstructured troubleshooting records. The text files may be obtained from one or more input collections such as a directory containing documents, a set of html files in a list of URLs, XML files or multiple textual fields from a database. In one embodiment of the invention, step 201 includes reading and preprocessing the input text by referring to a lexical parsing script as will be further described with respect to FIG. 3.

Once the text is input, criteria that relate to the content of the text are defined as shown by step 203. At least one criterion is input to describe the text to be transformed, but several criteria may be entered. For example, if the text includes descriptions of different automobiles, the criterion may be model, year, and color. In one embodiment of the invention, the criterion are defined in step 203 by importing criterion labels from an existing domain model made of numerical or symbolic criteria that describe the text domain.

A domain model is a set of criteria and usually values that can be derived from a database table where the criteria are the name of the fields, from an object oriented structure or database, spreadsheet or XML file. Connecting to an existing model is optional however; if no model already exists, the text transformation process starts from scratch. In this case, a user such as the application developer must create a set of criteria names on the fly and can optionally initialize some of these criteria with values.

In step 205, a high reliability matching method is applied to the text to identify values in the text that correspond to each of the criterion defined in step 203. As used herein, the term "high reliability" does not relate to any particular reliability factor, but rather defines a reliability that is high relative to the second matching method of step 207. Thus, as used herein, the term "lower reliability" also does not relate to any particular reliability factor, but rather defines a reliability that is low relative to the first matching method applied in step 205. The lower reliability matching method of step 207 is applied to the input text as a fall back method to identify values in the text for criteria that the high reliability method failed to provide a value for. Generally, higher reliability methods require less vocabulary, but can act on text having more contextual regularity. By contrast, lower reliability methods require more vocabulary, but can act on text having less contextual regularity. In a preferred embodiment, the high reliability matching method of step 205 is a pattern-based method, while the lower reliability method of step 207 is an ontology-based method with variable levels of tolerance to spelling mistakes and syntactic variations in strings. However, the matching methods of steps 205 and 207 may be any type of text transformation technique having an appropriate reliability level to provide the fallback feature of the transformation process. The use of pattern-based and ontology-based matching methods is further described with respect to FIG. 3 below.

Once the high and low reliability methods have been applied to the input text to identify values for the criteria, the values are associated with their respective criterion to create criterion-value pairs as shown in step 209. In one embodiment, the criterion-value pairs created in step 209 are given confidence factors that help resolve conflicts among different criteria that are associated with the same value. In step 211, the structured data is created based on the criterion-value pairs. By default, the structural data may simply be each of the criterion-value pairs identified in step 209. In other embodiments of the invention, however, the structural data may be selected criterion-value pairs that meet predetermined global confidence requirements. If the first application of the matching methods results in each criterion of step 203 being assigned a value and made into structured data, the process for transforming the input text ends at step 211. If after this first iteration, however, criterion exist that do not have a value, the process returns to step 205 for another iteration of the matching methods. In a preferred embodiment, the return includes an optional propagation technique that applies the values obtained and used in the criterion-value pairs to update the matching methods as will also be described below.

Thus, the text transformation process transforms a set of textual documents into structured records that can be fed to a structured advisory system such as the system 130 of FIG. 1. In the transformation process each input text is initially associated with criteria. The goal of the transformation process is to associate each criterion with numeric or symbolic values and, optionally, a global confidence level representing the quality of the identified criteria-value pair. At the end of the text transformation process, the recognized criterion-value pairs may then be turned into a structured record represented in the form of a set of criteria and values still pointing to the original text for display. A record may also be considered to be made of a set of criterion values alone.

Figure 3:
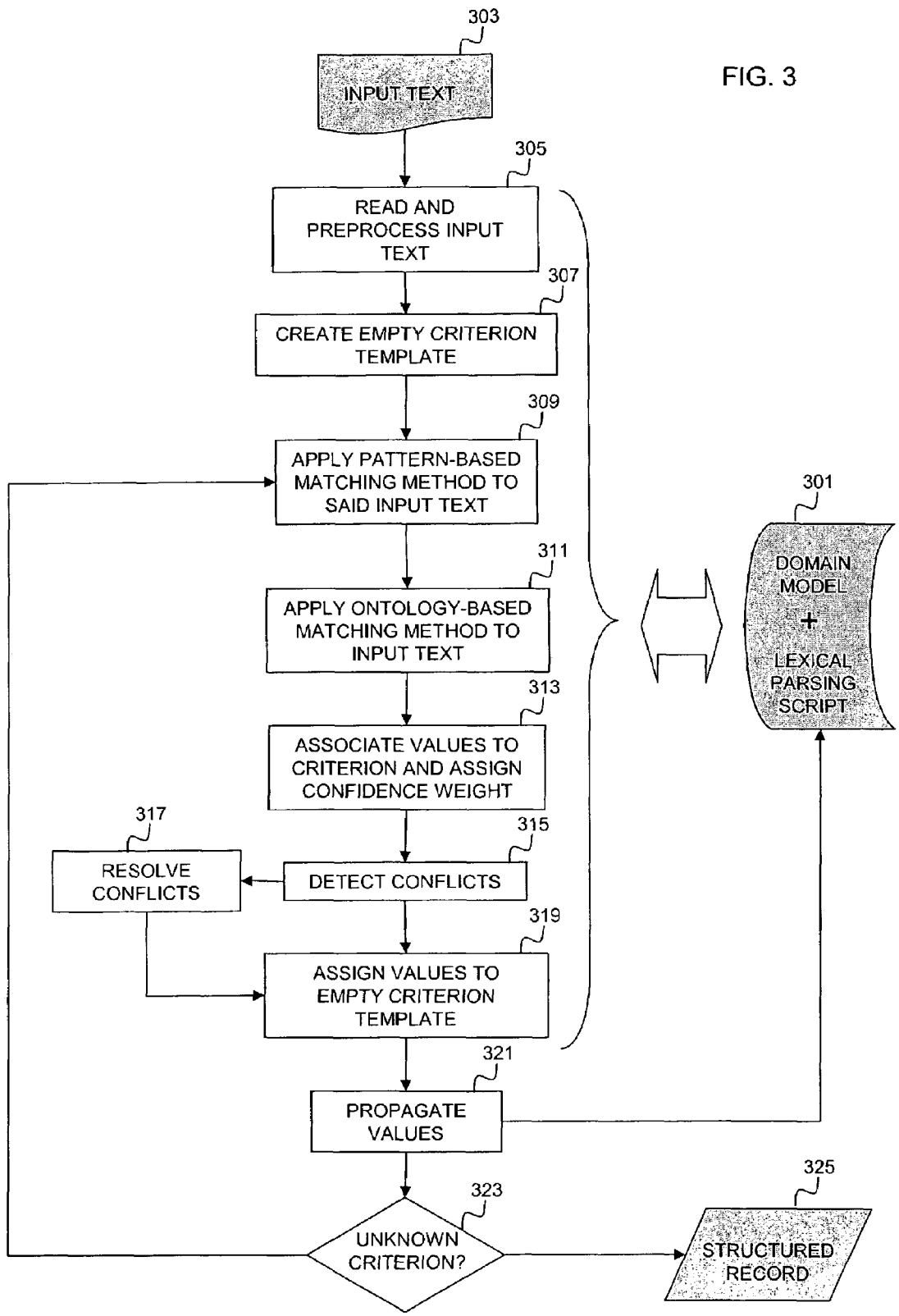
FIG. 3 is a flow chart showing a detailed text transformation process in accordance with one embodiment of the present invention.

FIG. 3 is a flow chart showing a detailed text transformation process in accordance with one embodiment of the present invention. As shown by step 301, a structured domain model and lexical parsing script are preferably used throughout the text transformation process of FIG. 3. The parsing script is a set of matching methods with reliability factors associated to domain criteria in the model and thus contains the lexical knowledge needed to analyze the input text and translate it into structured criteria/values pairs. The parsing script may also include a list of common words used to downplay stop words or the words that are too general for the domain. Use of the lexical parsing script in the text transformation process is further described, where relevant, in the process steps of FIG. 3.

The structured domain model contains a set of criteria with or without initial values. These criteria can be numeric with a set of constraints on their initial values (usually a pair of numerical boundaries), or symbolic. If a criterion is symbolic it can be optionally associated with a set of symbols organized in sets, taxonomies, or ordered lists. The model may also include a set of synonyms for the criteria initial values, as well as criticality weights and relationships among criterion if several criterion are included in the model. The synonyms can be strict synonyms or looser related sentences, while the criticality weights are used to assess the importance of the criteria in the model. As an example of a relationship among criteria, if the criterion car Model is set to the value: Honda Accord, and the criterion Model is linked to the criterion Engine Type in the domain model, the value V8 for Engine Type may be made unavailable once the value of Model is set to Honda Accord because these values are incompatible.

Specifically, there are two types of synonym definitions: one is strict synonyms and the other are looser synonym phrases that can be matched using the matching method attached to the associated criterion. Like regular synonyms, synonym phrases are attached to particular values. For example: a criterion called engine with a value broken can be associated to a phrase: "engine does not work" which may match any text of the form engine is not working, engine stall and does not work (if paired with a loose matching method as described below). Looser synonym sentence also provide more context to the ontology match (does not work must be found in the vicinity of the word engine for instance).

In step 303, text such as a free text document, unstructured database record XML, spreadsheet, or natural language query is input. In step 305, the input text is read and preprocessed. In one embodiment, step 305 includes decomposing the input text into a series of words and separators sequenced in the order of the apparition order in the text, and marking common words in the text such as stop words (articles, prepositions, etc.) and words that are too general and must be underscored during comparison matches; these words are not ignored but they add less weight than other words to a final matching weight. For example, a query: "not working" will match the value not working with a higher weight than the value working, but the value not working cannot be matched just on the basis of the word not even if 50% match is allowed because not is a common word. The common words in the input text are marked by comparison to a list of common words stored in the lexical parsing script as part of step 301. While preprocessing step 305 has been described with reference to marking common words and separators, it would be understood by one of ordinary skill in the art that different pre-processing options may be available. For instance one way of pre-processing html files is to replace any html tag by standard separators. In other embodiments, step 305 may include application specific pre-processors that format application specific terms and replace them with a normalized form. For instance, for a chemical application all terms such as A 12, A12, A-12 are replaced by their normalized form A12 when the file is loaded.

Once the text is input and preprocessed, an empty case criterion template is created in step 307. The criterion template is a list of several criteria labels that define the content of the input text. In the embodiment of FIG. 3, the criteria for the criterion template are imported from the domain model as part of step 301. For example, the following criterion template may be created from the domain model to analyze input text relating to cars.

Model
Year
Style
Price
Mileage
Exterior Color
Interior Color
Transmission

As described above, the domain model preferably includes values, synonyms for the values, and criticality weights associated with the criteria as well as relationships among the criteria. Any of these can be used in the text transformation process to associate values from the text with each criterion in the template.

In step 309, a pattern-based matching method is applied to the text to identify values in the text for each criterion in the template created in step 307. The pattern-based method is a robust method for identifying values using a form of pattern-based extraction rule that relies on contextual regularities in the way a given criterion is used in everyday sentences or in semi-formatted text collections. A simple example of contextual regularity is the way a numerical price tag might be identified by considering the strings that usually surrounds the value. For instance in a text, a value X representing a price could be identified with the patterns: $X or X dollars or X bucks where X is any sequence of digits. In the embodiment of FIG. 3, the pattern-based matching method of step 309 involves application of lexical rules obtained from the lexical parsing script as part of step 301. The highest reliability lexical rules are applied to the text first. The lexical rules may include extraction rules, constrained extraction rules and action based rules.

Extraction Rules are rules that can identify a criterion value in text without constraining the value to any pre-defined vocabulary. Extraction rules can perform two tasks: they can transform the input text into a set of structured criteria-value pairs, and they can acquire a new set of vocabulary by dynamically updating the pool of values associated with a criterion in the model. These values can then be re-used on the fly by any method that is based on pre-defined sets of values such as the constrained extraction rules and the model-based matcher described below. Because extraction rules can acquire new values for a criterion directly from a text without having to first define sets of possible initial values, these rules do not need to refer to the domain model for operation, but may be used to update the vocabulary in the domain model for use with matching methods that rely on pre-defined sets of terms to recognize values in a text.

In an extraction rule, the value to extract is either bound on its right and left by a set of constant symbols (contextual regularities), is a numeric type or has formatting regularities in the value itself. Thus, extraction rules require the input text to have a high degree of contextual regularity, but do not need predefined vocabulary. For example, a web page containing descriptions of used cars could refer to the color of the car in a semi-structure format: exterior color: blue; in this particular collection the color of the car is "any string between the strings exterior color: and the separation character ;". Alternatively, the value to extract using an extraction rule may contain regularities in the format of the value itself. An example of strings that contain regularities in their form would be a set of error codes of the form ddd-ddd where a lexical unit is made of three digits followed by a hyphen followed by three other digits. The following are examples of extraction rules, parenthesis identify the target value to extract:

(<Number>) dollars|bucks where Number is defined as a sequence of characters that can be digits or numeric separators such as a comma or a dot.

Exterior Color: (<*>); the * concept type means any succession of characters.

Constrained extraction rules are the second type of lexical rules and use lexical patterns where the target value to extract is constrained by a pre-existing sets of values. Thus, the constrained extraction rules need preexisting possible values to operate, but require less contextual regularity in the input text. For instance the rule: (<color>) seats used to recognize the interior color of a car (by contrast to the exterior color) returns a color if one of the symbols in the concept color precedes the word seats. In contrast, with a full fledge extraction rule, if the color is not defined in the concept type color, the rule will fail. As noted above, where a structured domain model is already defined before the case collection process starts, the vocabulary associated with each symbolic criterion is immediately available to the text analysis process. Criteria values with all their associated synonyms can be used in a constrained extraction rule or any other lexical rule to identify values in the input text. For instance, if a model contains a criterion called color with values red, blue and yellow. The pattern: "<color> interior" will match any input text of the form: red interior, blue interior, or yellow interior. In principle, constrained extraction rules are more knowledge intensive because they require pre-existing sets of values in the domain criteria or in the concept types. However, constrained extraction rules are more robust than pure extraction rules because having more constraints on the value to extract, they are generally less dependent on the context surrounding the value and on formatting conventions that may change from one collection to another.

A third type of lexical rule that may be used in step 309 is action performing rules, which are user interaction directives. If the body of a rule matches the input text the rule can initiate a specific interaction with the user. By default, action rules have a low priority and are only activated after all other means of identifying a value for the target criterion have been tried, and only if the system is in an interactive mode.

The pattern based matching method of step 309 can include any or all of extraction rules, constrained extraction rules and action performance rules. A more detailed discussion of lexical rules is provided in Appendix I herein. In a preferred embodiment, several of these rules or matching methods may be associated with each domain criterion (and therefore template criterion) as shown in the following, for example:

Criterion: interior color with: tight match
(H) M1: interior color: (<*>);
(H) M2 (<interior color>)<interior>
(L) M3 (<interior color>) with model-based match
(L) M4<interior>Action: AskUser("Do you have a preference for the seat colors?",<interior color>)
Where
<interior color>=(blue, beige, almond, gray, black, graphite)
<interior>=(seats, cloth, leather, interior)

In this example, M1 is an extraction rule, M2 is a constrained extraction rule, M3 is an ontology-based match directly on the values of the criterion: interior color using the matching strategy "tight match" that is moderately tolerant of spelling mistakes. M4 is an action rule that attempts to obtain the criterion value directly from the user if the interaction mode is enabled. Rules M1 and M2 have high reliability factors, and M3 and M4 have a low reliability factor. However, if a value is defined through the action rule M4, the result will still be considered as having a high degree of reliability because it is obtained through a user interaction procedure. The reliability factor of a matching method is used to determine the confidence of structural data created as will be described below. Moreover, as one of ordinary skill in the art would understand, the pattern-based matching method of step 309 is not limited to rules described above, any may include other pattern-based parsing methods such as finite automata, grammars, etc. An example of the finite automata method is disclosed in D. E. Appelt et.al. *FASTUS: A Finite-state Processor for Information Extraction from Realworld Text*. In Proceedings of the International Joint Conference on Artificial Intelligence, 1993, the entire content of which is incorporated herein by reference.

While pattern-based methods tend to be reliable in text that features a high degree of contextual regularity, these methods can become extremely complex or ineffective when the input text is unstructured or when the format of a document changes. Thus, in cases where the input text has a lower degree of contextual regularity, ontology-based matching methods such as entity finder methods are applied to the text as shown by step 311. This type of information extraction works by comparing the input text with a body of pre-defined vocabulary and/or by using entity specific recognition procedures. For example WO Pat. No. 9849632, the entire content of which is incorporated herein by reference, describes a system and method for entity-based data retrieval, which searches across multiple databases by classifying data into entities. The ontology-based matching methods of step 311 are simpler to define and maintain than methods that rely on the structure of a text because they do not require any lexical rules and because they are less dependent on brittle text formatting characteristics. However, these matching methods require a body of pre-defined vocabulary such as that provided by the model as part of step 301. Moreover, ontology-based (or model-based) methods are more risky because they tend to generate ambiguous results.

The ontology-based methods of step 311, are applied to all criteria in the criterion template for which no values were identified by the pattern-based method of step 309. For each criterion, all available words of the input text are compared to the set of active values for the criterion and a set of synonyms for the active values. An input word is available if either the matching strategy associated with the criterion can reuse words from another match or if the words are not already used to match another criterion. If a synonym is matched, the return value is the value of the criterion. If the criterion is numeric and the match is authorized, the input value is compared to the numerical boundaries associated with this criterion.

Thus, the ontology based matching methods are fallback methods where the higher reliability pattern based methods fail. For example, If a criterion is numeric and is constrained by numerical boundaries in the domain model, the model-based matching mechanism will compare this criterion with the text by testing the associated constraint. For example, in a query: "I want a car for less then 20,000 dollars", suppose that no lexical extraction rule exists to decide that 20,000 should be associated with the criterion price. In this case, the model-based analysis will kick in and find that price is defined in the model as a numeric value between [0 and 500,000]. If this is the only criterion that fits this definition it will associate the number 20,000 to the price with a default medium certainty value if it is the only possibility, or with a low certainty value if the system detects more than one matching criterion.

In a preferred embodiment, the ontological match is associated with matching strategies. Strategies include properties that define the tolerance of the text comparison function to spelling mistakes and partial definitions. The tolerance properties control the looseness of the comparison between the criterion values and the input text such as can California match a criterion containing California CA? or China Airline match China Air? The tolerance properties include two thresholds between 0 and 1 and a proximity window. The word similarity threshold defines how similar two words should be in order to be considered equal. A threshold of 1 means the two words must match exactly. Under a word threshold of 1, the term navy blue will not match the criterion value navy blues, but if the threshold is 0.8 it will. The second threshold is a global similarity threshold that defines what percentage of words in a symbolic criterion value should be recognized in order for the value to match the input text. If the global threshold=1, all the words in the criterion value should be found in the text. In other words, the value blue will not match navy blue if the global threshold is 1 but will match if this threshold is 0.5. The proximity window specifies constraints on the distance of the words in the input text. For example if the proximity window=1, the text beige leather seats will match the value beige seats; if the proximity window is 0 it will not. Other types of matching properties include indicators to specify if the order of the words in multi-word values should be taken into account (Preserve order flag) or not and if words in the input text can be used to match more than one criterion value. An example of this is the "Can Reuse property" described further below.

In step 313, the values identified by the pattern-based or ontology-based matching methods are associated to criteria in the case criterion template created in step 307. In the embodiment of FIG. 3, each criterion-value pair is assigned a confidence level factor that is used to resolve conflicts and assess the quality of the criterion-value pair. The confidence level (also called confidence weight) assessment depends on three types of criteria. The first type is an initial reliability factor associated with each matching method. By default, all pattern-based methods have a high reliability factor and all model-based methods have a medium reliability factor. The second criterion used in determining the confidence level is a recognition performance when a partial match is made. If the words in the input text could be exactly matched to values in a criterion, the recognition performance is high. If the tolerance (i.e. word and global threshold) is low and the input text only matches part of a value the performance is lower. Finally, the confidence level of a match depends on a degree of ambiguity—that is, the number of equivalent criterion values that can be associated with the same words from the input string of text. At the end of the process, each criterion-value pair is associated with a weight that takes into account the confidence level of the match along with the length of the matching value to favor values that include the maximum number of words. Longer values have a higher weight than shorter values so, for equivalent confidence levels, longer symbolic values are preferred to shorter ones.

In the embodiment of FIG. 3, the text transformation process also includes a conflict management technique to address situations where a value in the input text matches more than one criterion. In step 315, conflicts are detected by identifying a word or groups of words in the input text that can be associated with more than one criterion. In one embodiment of the invention, conflicts can arise for a word or input string of the input text that can be paired with more than one criterion by a pattern-based method and/or ontology based methods. More generally, however, a conflict may arise when using medium or low reliability matching techniques. If a conflict exists, the conflict is resolved in step 317 where conflict management properties define what to do if a value in the input text matches more than one criterion in the model.

The Can Reuse property is a Boolean value that specifies if a criterion can match a word in the input text that was previously matched to another criterion. A criterion that cannot reuse input terms involved in other matches is referred to as an exclusive criterion. If an Ignore Conflicts property is true and a value in the input text matches the associated criteria, the engine will not consider other choices and will ignore any matching conflicts for this criterion. If this property is false, the engine will consider other criteria and compute a degree of ambiguity in its assessment of the level of risk associated with the current value. For example, if the confidence level of the top text value is medium and the match is not ambiguous with respect to the current domain model, the top text value may be associated to the current criterion. If the level of confidence is medium and ambiguous or if the confidence is low, a validation technique takes place before the text is assigned to the criterion.

The validation technique takes place in any of the following situations:

(1) if the same words in the input text can be associated to more than one value in the same criterion;

(2) if different words in the input text can be matched to more values than the arity (maximum number of values that can be associated with a given criterion) of the criterion;

(3) if the same words from the input text can be matched to values in more than one criterion; or (4) if the recognized value is a parent node in a more detailed taxonomy. For instance, if the recognized value is "blue" and if this value is parent of the more detailed values "navy blue", "sky blue" and "teal", a validation can be asked to give the user an opportunity to specify a preference among these three children values. Where the system is operating in a non-interactive data acquisition mode, the validation technique is generation of a validation set that is later verified by a system user. Where the system is operating in an interactive user interface mode, the validation technique may be a validation request of clarifying question that is immediately sent to the user or an intermediate validation page with the option of changing the recognized criteria values and with a save case button (if the system is in a data acquisition mode) or a submit query button if the system is in a query mode. The non-interactive data acquisition mode and the interactive user interface mode are further described with respect to the embodiments of FIGS. 4 and 5 below.

Once conflicts are resolved, or if no conflicts existed, the process proceeds to step 319, where new values obtained are assigned to a corresponding criterion in the criterion template. This step may also make use of the confidence levels assigned in step 313. Specifically, if the confidence level is low and the system is running in an interactive mode the system will generate a clarifying question to the user. If the system is running in a non-interactive mode the resulting structured records will be saved in a validation set containing cases that should be validated by a user. These techniques will also be described in FIGS. 4 and 5 below.

In the embodiment of FIG. 3, the values obtained from the text are propagated to the domain model and lexical parsing script. That is, the vocabulary included in the domain model is updated with the new values obtained as part of the text transformation methods and all matching methods that are using the impacted criterion values are updated (synchronized with the model). Step 321 may also include Relationship propagation where, if a symbol value S1 is assigned to criterion C1 and C1 has a link with another criterion C2, then all values in C2 which have no corresponding case for the <C1, S1> criterion/value pair are deactivated for the rest of the analysis. For example, in the used car example, the criterion car model is linked to the criterion car style. If the system finds that in a given input text, the criterion car model is Honda Accord and that car style hatchback is not available for the Accord model, the value hatchback is deactivated from the model of possible values as soon as the engine recognizes the model Accord. As described above, in the embodiment of FIG. 3, new values are obtained only from pattern-based extraction rules. Therefore, the propagation step may be performed as part of the pattern-based matching step 309. This would allow the domain model to start without values and then apply ontology-based methods in step 311 using values obtained in step 309. However, where a structural domain model exists at the start of the text transformation process, the propagation step may occur after all matching methods are applied as shown in step 321 of FIG. 3. While in the preferred method propagation occurs right after each value is assigned to a criterion, when the propagation involves the creation of a new value and the update of the pattern-based matching methods, one option is to defer the update until after all methods are applied Decision block 323 determines if more unknown criteria still exist in the criterion template. Where no unprocessed criterion remains, the structured criterion-value pairs are stored in a structured record as shown by step 325. Where unknown criterions still exist, and there still exist applicable matching methods, the text analysis process runs a next pass and re-evaluates the input text. The next pass is typically run where bulk data is being transformed by the transformation process. Thus, all the input texts in the current collection are processed with the high reliability methods, the medium reliability methods are processed, followed by the low reliability. Each time a criterion value is updated in the model, the input records for which the corresponding criteria could not be determined are reprocessed to see if the updated methods can now be triggered.

Figure 4:
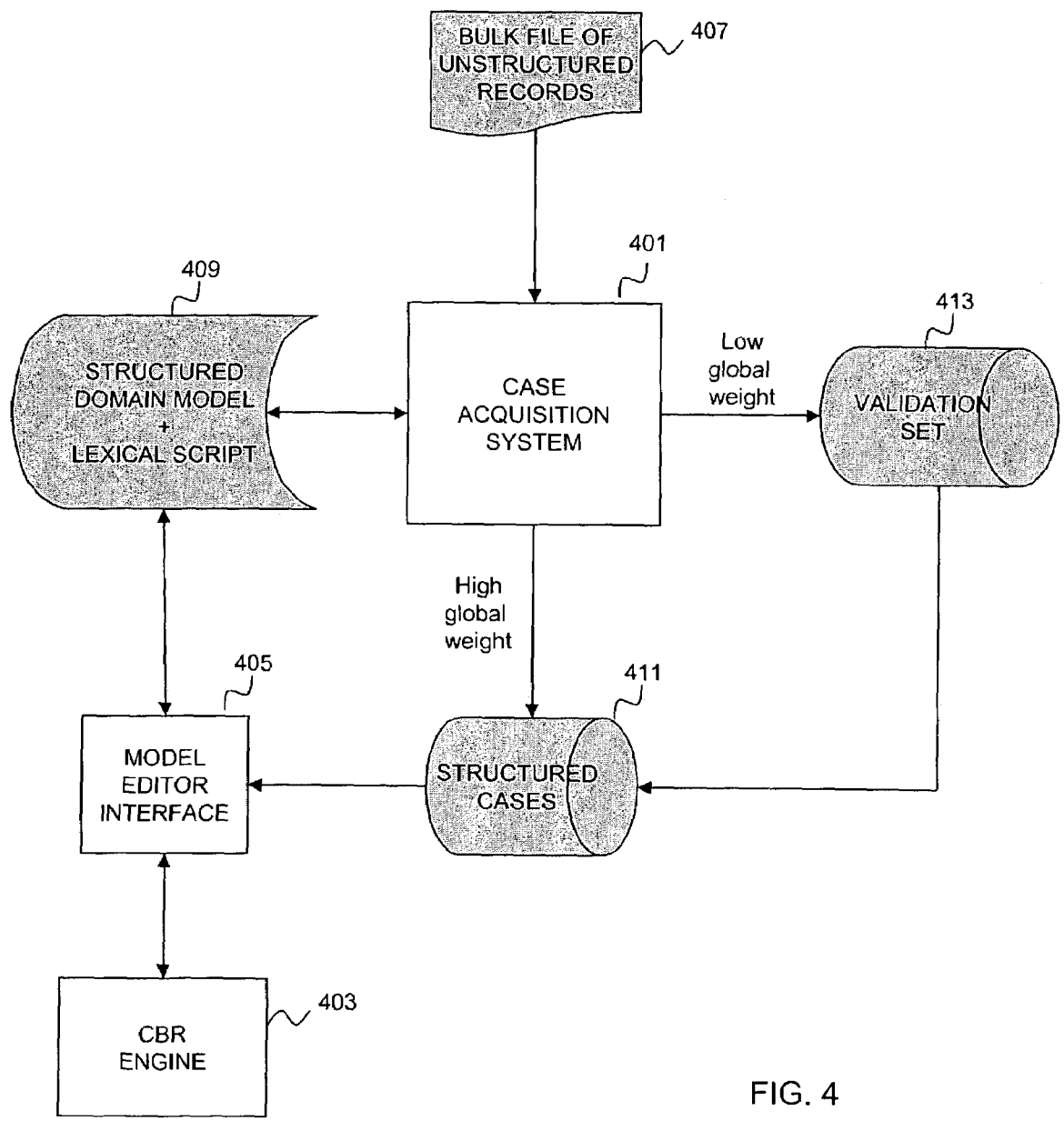
FIG. 4 is a system diagram showing a text transformation system used as an automatic case acquisition system in accordance with an embodiment of the present invention.

As noted above, the text transformation process may be used to automatically convert bulk files of unstructured or semi-structured text to structured data usable to a structured advisory system. FIG. 4 is a system diagram showing a text transformation system used as an automatic case acquisition system in accordance with an embodiment of the present invention. The system of FIG. 4 includes a case acquisition system 401, a CBR engine 403, and a model editor interface 405. The case acquisition system may be implemented as the text transformation system 120 described with respect to FIG. 1, or any other computer system for performing text transformation in accordance with any of the text transformation process embodiments described above. Similarly, the CBR engine may be an implementation of the structured advisory system 130 of FIG. 1, or may be implemented as any other computer system for providing solutions to case problems based on stored case experiences.

The model editor interface 405 is an interface that allows a system administration to add relations and similarity information usable to the CBR system. As a result of applying the text transformation process, it is likely that new values have been associated with the domain criteria. The Model Editor associated with the CBR system is a graphic editor that enables users to define different types of relationships between the criteria values and that enables them to add values to the domain model. For instance, if the system acquired the values: blue, navy blue and teal, the model editor lets the application developer group these values in a taxonomy where the parent is the color blue, and where navy blue and teal are children of this value. As a result the CBR system will consider the value navy blue and teal more similar than the values navy blue and red for instance. In general, the model editor enables users to define relationships and similarities between the elements of the domain model and might be used after the data acquisition phase to complete the domain representation acquired through the text transformation process. For example, application developers can define the similarity between siblings among the values in a given criterion, or they can specify what is the "penalty" associated with going up one level in a taxonomy (i.e. the user wants a navy blue car and the system retrieves a blue car or a teal car).

As seen in FIG. 4, the case acquisition system 401 inputs a bulk file of unstructured records 407 such as textual documents, semi-structured database tables, spreadsheets, or XML files. A structured domain model and lexical script 409 is also input to the case acquisition system 401 for use in converting the unstructured records into structured cases that can be used by the CBR engine 403. One output of the case acquisition system 401 is new values obtained by the text transformation process of the system and output to the structured domain model and lexical script 409 to dynamically update these items. Thus, the structured domain model may be a partially defined model having criterion describing the input text, which criterion may or may not values associated with them. That is, the case acquisition system can incrementally acquire new values for the domain criteria.

In the embodiment of FIG. 4, the case acquisition system 405 generates cases associated with a degree of confidence, which is a function of the degree of confidence associated with the recognized text values. Where the global confidence weight of a case is above a predetermined threshold, the case is output as a structured case 411 as part of a case base that can be directly imported to the CBR engine 403. Where the global confidence weight of a case is below a predetermined global confidence weight, the case is output as a validation set 413. Thus, a third output produced by the system is a validation set containing the cases that are rated by the system as the less reliable in terms of the system's confidence in the success of the transformation. Because the text transformation system of FIG. 4 is in a non-interactive mode, the cases in the validation set are ordered in increasing order of confidence for review by a user during a later validation phase. In the case validation phase a user reviews the cases, modifies the values assigned to the criteria and confirms the validation set 413. After the validation set is reviewed and confirmed by the user, the validation set is also input as structured case for use by the CBR engine 403.

Figure 5:
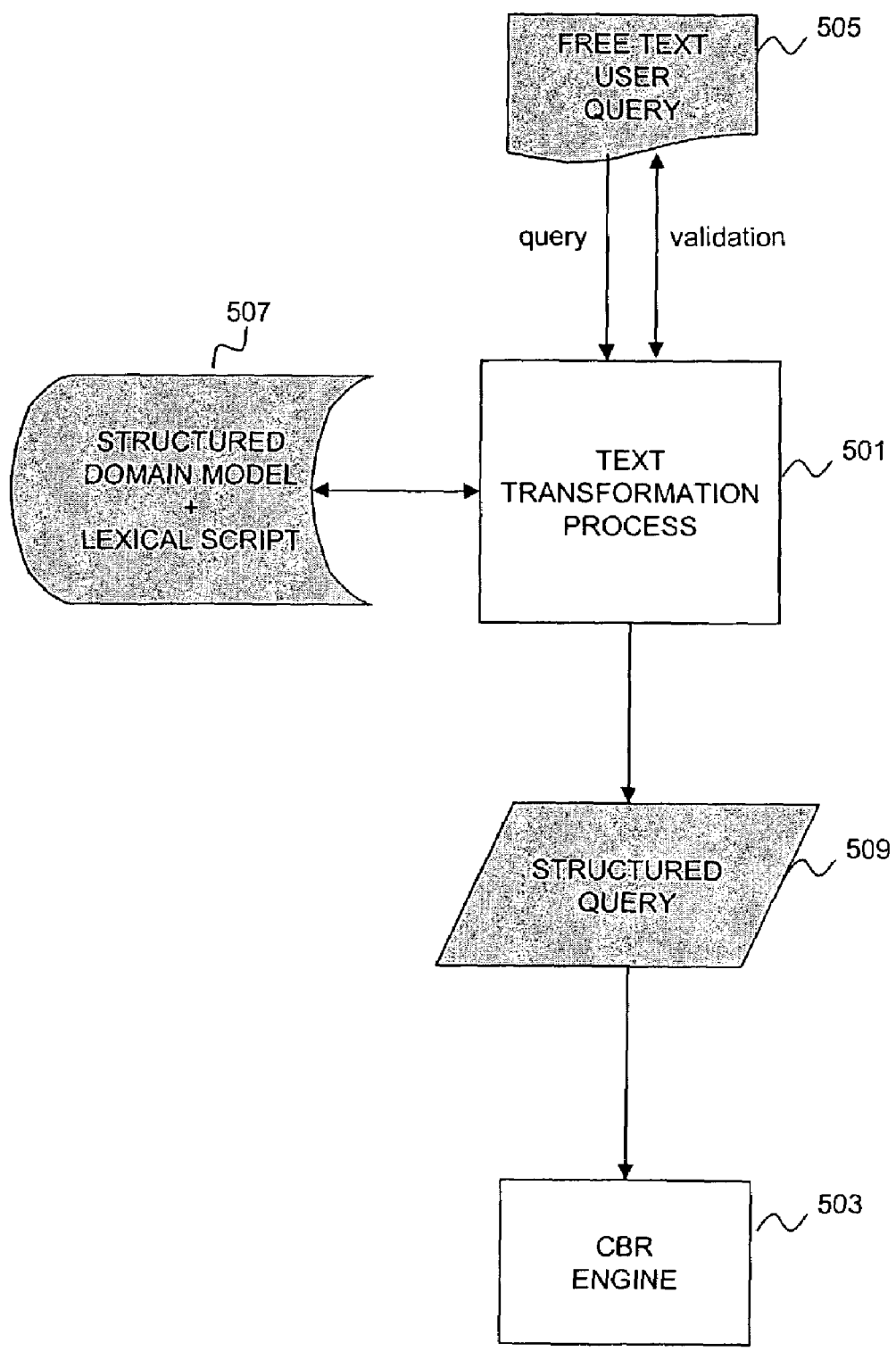
FIG. 5 is a system diagram showing a text transformation system used as a user interface to a CBR engine in accordance with an embodiment of the present invention.

As also noted above, the inventive text transformation process may be used to convert free-text user queries into a structured format usable to a structured advisory system. FIG. 5 is a system diagram showing a text transformation system used as a user interface to a CBR engine in accordance with an embodiment of the present invention. The system of FIG. 5 includes a user interface 501 and CBR engine 503. The user interface system may be implemented as the text transformation system 120 described with respect to FIG. 1, or any other computer system for performing text transformation in accordance with any of the text transformation process embodiments described above. Similarly, the CBR engine may be implemented as the structured advisory system 130 of FIG. 1, or any other computer system for providing solutions to case problems based on stored case experiences.

As seen in FIG. 5, the user interface system 501 inputs a free-text user query 505 and outputs a structured query usable to the CBR engine 503. For instance, if the user asks the system for: <<a silver convertible for less than $10,000 and with less than 100,000 miles>>, the method recognizes that silver is the exterior color, that the type of the car is a convertible, that $10,000 is the price, and 100,000 is the maximum value for mileage. If no cars match these requirements exactly, the CBR engine will retrieve a close match: e.g. a gold or white convertible for $10,534 dollars and 92,000 miles. A structured domain model and lexical script 507 is also input to the user interface system for use in converting the natural language query into a structured query that can be used by the CBR engine 503. In the embodiment of FIG. 5, the structured domain model and lexical script 507 are complete and do not get dynamically updated by the text transformation process of the user interface system. However, other embodiments may include the dynamic update technique.

The user interface system is preferably operated in an interactive mode and generates structured queries with a degree of confidence, which is a function of the degree of confidence associated with recognized text values. Where the global confidence weight of a query is above a predetermined threshold, the query is output as a structured query 509 that can be submitted to the CBR engine 503. Where the global confidence weight of a query is below a predetermined global confidence weight, a clarifying question is generated and output to the user as shown in FIG. 5. The clarifying question may be an intermediary validation page at the end of the text transformation process or a direct question to the user to solve ambiguities before assigning a value to a criterion. In the free-text query context the output of the analysis and clarifying questions can be seamlessly integrated with complementary questions generated by the induction mechanism of the advisory system. The method of the present invention will then ask the user questions to clarify the meaning of the textual query and to acquire more information when the query is not complete, or lead to a large result set.

FIG. 6 illustrates a computer system 601 which may be used to implement a text transformation process according to an embodiment of the present invention. Computer system 601 includes a bus 603 or other communication mechanism for communicating information, and a processor 605 coupled with bus 603 for processing the information. Computer system 601 also includes a main memory 607, such as a random access memory (RAM) or other dynamic storage device (e.g., dynamic RAM (DRAM), static RAM (SRAM), synchronous DRAM (SDRAM), flash RAM), coupled to bus 603 for storing information and instructions to be executed by processor 605. In addition, main memory 607 may be used for storing temporary variables or other intermediate information during execution of instructions to be executed by processor 605. Computer system 601 further includes a read only memory (ROM) 609 or other static storage device (e.g., programmable ROM (PROM), erasable PROM (EPROM), and electrically erasable PROM (EEPROM)) coupled to bus 603 for storing static information and instructions for processor 605. A storage device 611, such as a magnetic disk or optical disc, is provided and coupled to bus 603 for storing information and instructions.

The computer system 601 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 601 using an appropriate device bus (e.g., a small computer system interface (SCSI) bus, an enhanced integrated device electronics (IDE) bus, or an ultra-direct memory access (DMA) bus). The computer system 601 may additionally include a compact disc reader, a compact disc reader-writer unit, or a compact disc juke box, each of which may be connected to the same device bus or another device bus.

Computer system 601 may be coupled via bus 603 to a display 613, such as a cathode ray tube (CRT), for displaying information to a computer user. The display 613 may be controlled by a display or graphics card. The computer system includes input devices, such as a keyboard 615 and a cursor control 617, for communicating information and command selections to processor 605. The cursor control 617, for example, is a mouse, a trackball, or cursor direction keys for communicating direction information and command selections to processor 605 and for controlling cursor movement on the display 613. In addition, a printer may provide printed listings of the structured data or any other data stored and/or generated by the computer system 601.

The computer system 601 performs a portion or all of the processing steps of the invention in response to processor 605 executing one or more sequences of one or more instructions contained in a memory, such as the main memory 607. Such instructions may be read into the main memory 607 from another computer-readable medium, such as storage device 611. One or more processors in a multiprocessing arrangement may also be employed to execute the sequences of instructions contained in main memory 607. In alternative embodiments, hard-wired circuitry may be used in place of or in combination with software instructions. Thus, embodiments are not limited to any specific combination of hardware circuitry and software.

As stated above, the system 601 includes at least one computer readable medium or memory programmed according to the teachings of the invention and for containing data structures, tables, records, or other data described herein. Stored on any one or on a combination of computer readable media, the present invention includes software for controlling the computer system 601, for driving a device or devices for implementing the invention, and for enabling the computer system 601 to interact with a human user, e.g., a customer. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 605 for execution. A computer readable medium may take many forms, including but not limited to, non-volatile media, volatile media, and transmission media. Non-volatile media includes, for example, optical, magnetic disks, and magneto-optical disks, such as storage device 611. Volatile media includes dynamic memory, such as main memory 607. Transmission media includes coaxial cables, copper wire and fiber optics, including the wires that comprise bus 603. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 605 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 601 may receive the data on the telephone line and use an infrared transmitter to convert the data to an infrared signal. An infrared detector coupled to bus 603 can receive the data carried in the infrared signal and place the data on bus 603. Bus 603 carries the data to main memory 607, from which processor 605 retrieves and executes the instructions. The instructions received by main memory 607 may optionally be stored on storage device 611 either before or after execution by processor 605.

Computer system 601 also includes a communication interface 619 coupled to bus 603. Communication interface 619 provides a two-way data communication coupling to a network link 621 that is connected to a local network (e.g., LAN 623). For example, communication interface 619 may be a network interface card to attach to any packet switched local area network (LAN). As another example, communication interface 619 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 619 sends and receives electrical, electromagnetic or optical signals that carry digital data streams representing various types of information.

Network link 621 typically provides data communication through one or more networks to other data devices. For example, network link 621 may provide a connection through LAN 623 to a host computer 625 or to data equipment operated by a service provider, which provides data communication services through an IP (Internet Protocol) network 627 (e.g., the Internet 607). LAN 623 and IP network 627 both use electrical, electromagnetic or optical signals that carry digital data streams. The signals through the various networks and the signals on network link 621 and through communication interface 619, which carry the digital data to and from computer system 601, are exemplary forms of carrier waves transporting the information. Computer system 601 can transmit notifications and receive data, including program code, through the network(s), network link 621 and communication interface 619.

Obviously, numerous modifications and variations of the present invention are possible in light of the above teachings. It is therefore to be understood that within the scope of the appended claims, the invention may be practiced otherwise than as specifically described herein. For example, different levels of interactivity may be used in the system. An example of this would be none, low and high level of interactivity. Under high interactivity more questions are asked. For instance if the system is interacting with a user and the user say blue and blue is the head of a taxonomy with children navy blue and teal. The system will come back with a question: Would you prefer blue, navy blue or teal if the level of interactivity is high. Under standard interaction level the system will just select blue, no questions asked.

APPENDIX I

The following section provides a more detailed explanation of the format of the lexical rules and describes an interactive rule acquisition method to facilitate the definition of these rules by a human expert.

Lexical rules can perform three tasks: extract criterion values, define a context in which the context associated matching methods will be applied, or exclude parts of the input text. The criterion extraction rules are made up of a body and a return statement. The body is a sequence of units such as a string, a set (separated by the OR operator), a free variable, or a variable constrained by a type (i.e. float, integer, color, etc). If a unit has the same name as a criterion name (<criterion name>) the unit automatically refers to the disjunction of this criterion values and to their synonyms. For instance, if a criterion color has three values: red, blue and yellow, the expression (<color>) car is equivalent to the expression (red OR blue OR yellow) car. If burgundy is a synonym of the red color, the expression would be (red OR burgundy OR blue OR yellow) and if the rule matches the burgundy color, the returned value would be red (and not burgundy). Examples of variable types are:

$(<*>); The * sign represents any string between the "$" and ";" characters.

$(<float>) the <float> concept type represents any numeric value of type <float>. This is a constrained variable, as it must match the float definition.

(<number>) (dollar|buck) this expression has two units: a constraint variable of type <number> and a disjunctive expression "dollar" or "buck".

Parentheses indicate that the included matching string will be returned by the pattern.

When the target unit refers to a type that is more general than the text that will be analyzed (this is the case for types such as *, float, integer and number for example), the rule is an extraction rule that can acquire new values for a criterion. When the type of a value to extract is restricted to a set of pre-defined values such as, color={red, blue,yellow}, the associated rule cannot acquire new values.

The return statement is a condition on the value (or values) returned by the pattern. The symbol $n refers to the nth value returned by the body of the rule. For instance, —Condition: $1>10000 Returns: "$1 is expensive"—means that if the return value is bigger than a 10000, a concatenation between the first extracted value ($1) and the string "is expensive" is returned. Where the input text is: "the price of the car is $25,000," the above lexical pattern returns: "$25,000 is expensive"

Rules are created with a default certainty factor that can be modified to specify that the reliability of a rule be considered less than standard. The Context Definition Rules extract a string in the input text and are associated to a criterion in the domain model. If a criterion has a context rule then all the other matching methods (this includes rules and ontology-matches) associated to this criterion will only apply to the portion of the text returned by the concept definition rule. For example:

Criterion: Ram
Context: PC Description: (<*>) Stores
Criterion Rules: (<number>)<unit>(ram|memory).

Since the context definition rule returns the string included between PC Description and Stores the criterion rule will only be applied to the text included between these two strings. An exclude rule stipulates that the corresponding text should be ignored during the text analysis. Both context definition rules and exclude rules do not have any Return statement associated.

The interactive definition of lexical rules from examples is the process of defining a criterion extraction rule from a particular textual example. This phase has three steps. In a text selection step, the user opens a text record and selects a string that includes the value to be extracted. For example, in a query "I want a PC with a Ram of 128 Mo", this string will be "Ram of 128 Mo". In a target selection step, the user indicates what unit (word or sequential group of words) should be assigned to the current criterion when the system analyses the text. In the above example, the user selects the numerical value "128". Finally, an interactive generalization step allows the user to select a string to generalize. This process involves replacing the selected string with a more general variable type such as "float", "integer" or with a type containing a set of symbols. The interactive definition of a rule may also be accompanied by an evaluation feedback phase, which, when a new rule is defined, provides feedback on the % of input records that can be covered by this rule and on the value extracted.

We claim:

1. A computer-readable software system for effecting on a computer an automatic case acquisition system using a text transformation system, the system comprising:
a case acquisition system;
a case based reasoning engine; and
a model editor interface;

wherein the case acquisition system comprises a memory device having embodied therein, data related to transforming text into structure data, and a processor in communication with said memory device, said processor configured to cause the system to input text to be transformed into structured data, define at least one criterion relating to content of said text, apply a first matching method to said text to identify a value in said text for each of said criterion, apply a second matching method to said text to identify a value in said text for each of said criterion that said first matching method fails to identify a value for, associate each of said criterion with a value obtained by said first or second matching method to create at least one criterion-value pair, and create structure data based on said at least one criterion-value pair, where the first matching method has a higher reliability than said second matching method;

wherein the case based reasoning engine comprises a structured advisory system; and wherein the model editor interface comprises an interface that allows a system administration to add at least a relation and at least a similarity information usable to the case based reasoning engine.

2. The system of claim 1, wherein the case acquisition system inputs a bulk file of unstructured records such as textual documents.

3. The system of claim 1, wherein the case acquisition system inputs a bulk file of unstructured records such as semi-structured database tables.

4. The system of claim 1, wherein the case acquisition system inputs a bulk file of unstructured records such as spreadsheets.

5. The system of claim 1, wherein the case acquisition system inputs a bulk file of unstructured records such as XML files.

6. The system of claim 1, wherein the case acquisition system inputs a structured domain model and a lexical script for use in converting the unstructured records into structured cases that can be used by the case based reasoning engine.

7. The system of claim 1, wherein the first matching method is a pattern-based matching method.

8. The system of claim 1, wherein the second matching method is an ontology-based matching method.

9. The system of claim 1, wherein the defining criterion comprises importing at least one criterion from a domain model.

10. The system of claim 9, further comprising importing a relationship correspond to any two of said criterion, said relationship being used in at least one of said first and second matching method.

11. The system of claim 1, further comprising detecting a conflict when a word in the input text matches more than one of said criterion.

12. The system of claim 1, further comprising assigning a confidence level to any of said. criterion-value pairs.

13. The system of claim 1, further comprising propagating values of said structured data to a domain model.

14. The system of claim 1, wherein said first and second matching methods are different types of matching methods.

15. The system of claim 1, wherein said first and second matching methods are a same type of matching method having different levels of reliability.

16. A system for generating cases to be used by a cased based reasoning engine, the system comprising a memory device having embodied therein, data related to generating cases used by a cased based reasoning engine, and a processor in communication with the memory device, the processor configured to cause the system to comprise:

a case acquisition system;

a case based reasoning engine;

a model editor interface;

at least a bulk file of unstructured records;

a structured domain model and lexical script;

a validation set of cases created by the case acquisition system to be validated by a user to be added to the structured cases; and structured cases created by the case acquisition system;

wherein the case acquisition system is a text transformation system able to transform bulk files of unstructured records into data to be processed ultimately by the case base reasoning engine, the model editor interface comprises an interface that allows a system administration to add at least a relation and at least a similarity information usable to the case based reasoning engine, the model editor interface taking input from the structured cases or the structured domain model and lexical script.

17. A computer-readable software system embodied on a computer-readable medium for generating cases to be used by a cased based reasoning engine associated with a degree of confidence, the system comprising:

at least a bulk file of unstructured records;

a case acquisition system able to transform bulk files of unstructured records into either a validation set of cases or a structured set of cases;

a case based reasoning engine able to process the structured set of cases;

wherein the validation set of cases is validated by a user and then added to the structured set of cases, and where the case acquisition system generates cases associated with a degree of confidence function of a degree of confidence associated with the recognized text values at a threshold, where cases with a degree of confidence lower than the threshold are sent to the validation set and the cases associated with a degree of confidence higher than the threshold are sent to the structured set of cases.

* * * * *